US011470490B1

(12) United States Patent
Tuli et al.

(10) Patent No.: US 11,470,490 B1
(45) Date of Patent: Oct. 11, 2022

(54) DETERMINING PERFORMANCE OF A WIRELESS TELECOMMUNICATION NETWORK

(71) Applicant: T-Mobile USA, Inc., Bellevue, WA (US)

(72) Inventors: Ashish Tuli, Ashburn, VA (US); Heitor Almeida, Redmond, WA (US); Kiranpal Chaggar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/322,479

(22) Filed: May 17, 2021

(51) Int. Cl.
*H04W 24/08* (2009.01)
*H04B 17/318* (2015.01)
*H04W 24/10* (2009.01)

(52) U.S. Cl.
CPC .......... *H04W 24/08* (2013.01); *H04B 17/318* (2015.01); *H04W 24/10* (2013.01)

(58) Field of Classification Search
CPC ............................ H04W 24/08; H04W 24/10
See application file for complete search history.

(56) References Cited

U.S. PATENT DOCUMENTS

| | | | |
|---|---|---|---|
| 8,639,256 B2 | 1/2014 | Garavaglia et al. |
| 8,645,194 B1 | 2/2014 | Lehmann et al. |
| 8,645,393 B1 | 2/2014 | Kolak et al. |
| 8,755,831 B2 | 6/2014 | Brewer et al. |
| 8,782,216 B2 | 7/2014 | Raghavendran et al. |
| 8,964,582 B2 | 2/2015 | Wilkinson |
| 8,966,055 B2 | 2/2015 | Mittal et al. |
| 9,057,620 B2 | 6/2015 | Dave et al. |
| 9,083,610 B2 | 7/2015 | Griff et al. |
| 9,113,345 B2 | 8/2015 | Griff et al. |
| 9,119,086 B1 | 8/2015 | Ouyang et al. |
| 9,167,453 B2 | 10/2015 | Kapnadak et al. |
| 9,262,481 B1 | 2/2016 | Le et al. |
| 9,264,932 B2 | 2/2016 | Chen et al. |
| 9,367,694 B2 | 6/2016 | Eck et al. |
| 9,392,473 B2 | 7/2016 | Kapnadak et al. |
| 9,424,121 B2 | 8/2016 | Kushnir et al. |
| 9,424,340 B1 | 8/2016 | Kapoor et al. |
| 9,480,013 B2 | 10/2016 | Fang et al. |
| 9,635,116 B2 | 4/2017 | Anand et al. |
| 9,680,915 B2 | 6/2017 | Pradhan et al. |
| 9,706,411 B2 | 7/2017 | Goswami et al. |
| 9,853,867 B2 | 12/2017 | Baccarani |
| 9,888,438 B2 | 2/2018 | Fang et al. |
| 9,929,908 B2 | 3/2018 | Ketheesan et al. |
| 9,955,488 B2 | 4/2018 | Ouyang et al. |
| 10,039,013 B2 | 7/2018 | Periyasamy et al. |

(Continued)

*Primary Examiner* — Kevin Kim
(74) *Attorney, Agent, or Firm* — Perkins Coie LLP

(57) ABSTRACT

The disclosed system defines a hierarchical subdivision of a geographic area including a unit, a cluster, a region, and an area, where the area includes multiple regions, the region includes multiple clusters, and the cluster includes multiple units. The system obtains KPIs associated with a unit and obtains a network score for the cluster by combining each KPI associated with each unit in the cluster. The system obtains a competitor network score associated with a competing network. Based on the competitor network score and the network score, the system can determine whether the cluster, the region, and the area are performing satisfactorily.

20 Claims, 10 Drawing Sheets

(56) References Cited

U.S. PATENT DOCUMENTS

| | | |
|---|---|---|
| 10,075,855 B2 | 9/2018 | Ben Ami et al. |
| 10,091,679 B1 | 10/2018 | Munar et al. |
| 10,164,850 B2 | 12/2018 | Tapia et al. |
| 10,187,899 B2 | 1/2019 | Ouyang et al. |
| 10,223,358 B2 | 3/2019 | Vartakavi et al. |
| 10,237,767 B2 | 3/2019 | Niemoeller |
| 10,251,102 B2 | 4/2019 | Levinkron et al. |
| 10,299,241 B2 | 5/2019 | Ramamurthy |
| 10,306,480 B2 | 5/2019 | Vanhatupa et al. |
| 10,306,490 B2 | 5/2019 | Ratakonda et al. |
| 10,311,197 B2 | 6/2019 | Pikus |
| 10,318,973 B2 | 6/2019 | Milton et al. |
| 10,334,488 B2 | 6/2019 | Periyasamy et al. |
| 10,459,954 B1 | 10/2019 | Walters et al. |
| 10,477,426 B1 | 11/2019 | Tiwari et al. |
| 10,509,816 B2 | 12/2019 | Hong et al. |
| 10,546,241 B2 | 1/2020 | Yang et al. |
| 10,548,032 B2 | 1/2020 | Ouyang et al. |
| 10,555,191 B1 | 2/2020 | Jat et al. |
| 10,609,570 B2 | 3/2020 | Martone et al. |
| 10,609,587 B2 | 3/2020 | Livschitz et al. |
| 10,613,838 B2 | 4/2020 | Kim et al. |
| 2006/0161471 A1 | 7/2006 | Hulen et al. |
| 2010/0123575 A1 | 5/2010 | Mittal et al. |
| 2010/0248771 A1 | 9/2010 | Brewer et al. |
| 2012/0072267 A1 | 3/2012 | Gutierrez et al. |
| 2012/0135766 A1 | 5/2012 | Garavaglia et al. |
| 2013/0031242 A1 | 1/2013 | Raghavendran et al. |
| 2013/0163438 A1 | 6/2013 | Wilkinson |
| 2013/0196685 A1 | 8/2013 | Griff et al. |
| 2013/0331109 A1 | 12/2013 | Dhillon et al. |
| 2014/0075002 A1 | 3/2014 | Pradhan et al. |
| 2014/0129298 A1 | 5/2014 | Hulen et al. |
| 2015/0023163 A1 | 1/2015 | Gonzalez et al. |
| 2015/0120391 A1 | 4/2015 | Jodice et al. |
| 2015/0142301 A1 | 5/2015 | Dave et al. |
| 2015/0146547 A1 | 5/2015 | Kapnadak et al. |
| 2015/0189550 A1 | 7/2015 | Harrang |
| 2015/0332054 A1 | 11/2015 | Eck et al. |
| 2015/0334593 A1 | 11/2015 | Chen et al. |
| 2016/0007217 A1 | 1/2016 | Kapnadak et al. |
| 2016/0157126 A1 | 6/2016 | Nuss et al. |
| 2016/0162346 A1 | 6/2016 | Kushnir et al. |
| 2016/0344606 A1 | 11/2016 | Baccarani |
| 2016/0353368 A1 | 12/2016 | Fang et al. |
| 2016/0357872 A1 | 12/2016 | Fader et al. |
| 2016/0360539 A1 | 12/2016 | Ben Ami et al. |
| 2016/0373950 A1 | 12/2016 | Niemoeller |
| 2016/0381580 A1* | 12/2016 | Kwan ................ H04L 41/16 370/252 |
| 2017/0012841 A1 | 1/2017 | Ketheesan et al. |
| 2017/0013484 A1 | 1/2017 | Liu et al. |
| 2017/0052957 A1 | 2/2017 | Belletti et al. |
| 2017/0053224 A1 | 2/2017 | Duca et al. |
| 2017/0053225 A1 | 2/2017 | Brummet et al. |
| 2017/0064569 A1 | 3/2017 | Martone et al. |
| 2017/0078171 A1 | 3/2017 | Tapia et al. |
| 2017/0150365 A1 | 5/2017 | Goswami et al. |
| 2017/0200088 A1 | 7/2017 | Yang et al. |
| 2017/0255617 A1 | 9/2017 | Vartakavi et al. |
| 2017/0272319 A1 | 9/2017 | Sheen et al. |
| 2017/0290024 A1 | 10/2017 | Ouyang et al. |
| 2017/0318555 A1 | 11/2017 | Libschitz et al. |
| 2018/0160345 A1 | 6/2018 | Levinkron et al. |
| 2018/0184307 A1 | 6/2018 | Periyasamy et al. |
| 2018/0184344 A1 | 6/2018 | Periyasamy et al. |
| 2018/0197095 A1 | 7/2018 | Sponaugle |
| 2018/0225587 A1 | 8/2018 | Khidekel et al. |
| 2018/0227930 A1* | 8/2018 | Ouyang ............... H04L 41/0896 |
| 2018/0270678 A1 | 9/2018 | Munar et al. |
| 2018/0307994 A1 | 10/2018 | Cheng et al. |
| 2018/0322876 A1 | 11/2018 | Bocklet et al. |
| 2019/0053189 A1 | 2/2019 | Ramamurthy |
| 2019/0068443 A1 | 2/2019 | Li et al. |
| 2019/0089611 A1 | 3/2019 | Kondalam et al. |
| 2019/0102453 A1 | 4/2019 | Fume et al. |
| 2019/0104427 A1 | 4/2019 | Munar et al. |
| 2019/0114649 A1 | 4/2019 | Wang et al. |
| 2019/0132414 A1 | 5/2019 | Bongaarts et al. |
| 2019/0132757 A1 | 5/2019 | Tapia et al. |
| 2019/0199589 A1 | 6/2019 | Le et al. |
| 2019/0239095 A1 | 8/2019 | Ouyang et al. |
| 2019/0239101 A1 | 8/2019 | Ouyang et al. |
| 2019/0259033 A1 | 8/2019 | Reddy et al. |
| 2019/0311367 A1 | 10/2019 | Reddy et al. |
| 2019/0356533 A1 | 11/2019 | Vasseur et al. |
| 2019/0370399 A1 | 12/2019 | Helander et al. |
| 2020/0008078 A1 | 1/2020 | Andersson et al. |
| 2020/0036605 A1 | 1/2020 | Xie et al. |

\* cited by examiner

DETERMINING PERFORMANCE OF A WIRELESS TELECOMMUNICATION NETWORK

BACKGROUND

A wireless telecommunication network, such as a cellular network or mobile network, is a communication network in which the last link is wireless. The network is distributed over land areas called "cells," each served by at least one fixed-location transceiver, but more normally served by three cell sites or base transceiver stations, e.g., towers. These base stations provide the cell with the network coverage which can be used for transmission of voice, data, and other types of content.

When joined, these cells provide radio coverage over a wide geographic area. This enables numerous portable transceivers (e.g., mobile phones, tablets, and laptops equipped with mobile broadband modems, pagers, etc.) to communicate with each other and with fixed transceivers and telephones anywhere in the network via base stations, even if some of the transceivers are moving through more than one cell during transmission.

The many elements in the complex wireless telecommunication network can have various technical issues, such as technical issues with the base transceiver stations, sectors, antennas, or even the mobile devices using the wireless telecommunication network. Consequently, a method and system are needed to determine the performance of the wireless telecommunication network.

BRIEF DESCRIPTION OF THE DRAWINGS

Detailed descriptions of implementations of the present invention will be described and explained through the use of the accompanying drawings.

Figure 1:
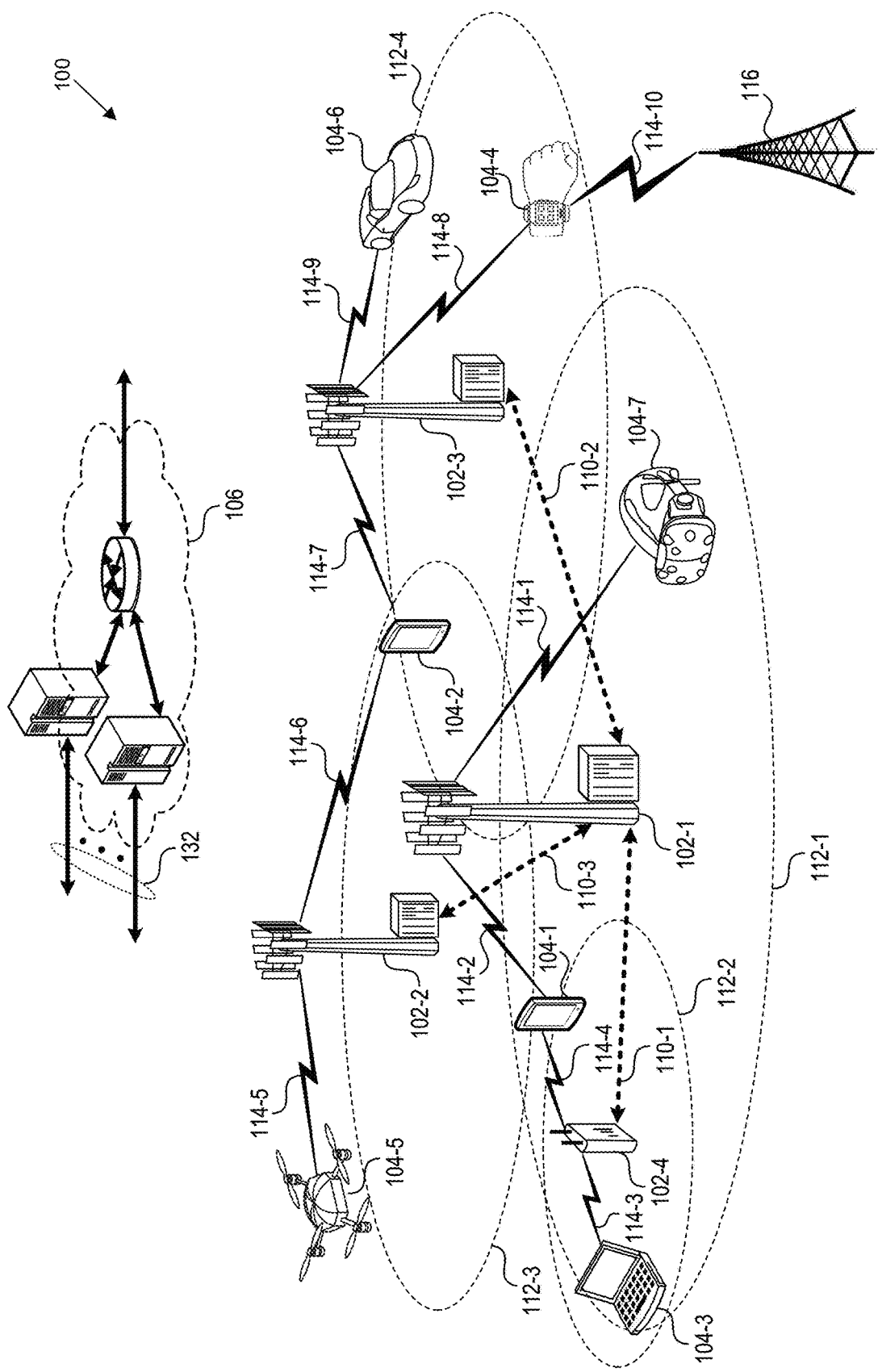
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to determine the performance of a wireless telecommunication network. The system can define a hierarchical subdivision of a geographic area, such as ranging from a smallest unit (e.g. hexagonal geographic area), a cluster of units, a region of clusters, to a larger geographic area. The system can obtain multiple key performance indices (KPIs) associated with each unit, such as signal strength, speed, and coverage associated with a wireless telecommunication network. The system can combine the subset of multiple units contained in the cluster by weighting each KPI among the multiple KPIs associated with each unit in the multiple units based on population living in or visiting each unit to obtain a KPI aggregation for each KPI. Based on the KPI aggregation, the system can then combine the multiple KPI aggregations into a network score indicating the wireless telecommunication network performance.

The system can also obtain an experience score indicating user satisfaction with the wireless telecommunication network, where users are located within the clusters. The system can obtain a competitor network score associated with a competing wireless telecommunication network. Based on the competitor network score, the network score, and the experience score, the system can determine whether the cluster, the region, and the area are performing satisfactorily. If the cluster, the region, and the area are not performing satisfactorily, the system can indicate that additional upgrades, such as hardware or software upgrades, need to be performed on the wireless telecommunication network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-7, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Determining Performance of the Wireless Telecommunication Network

Figure 2:
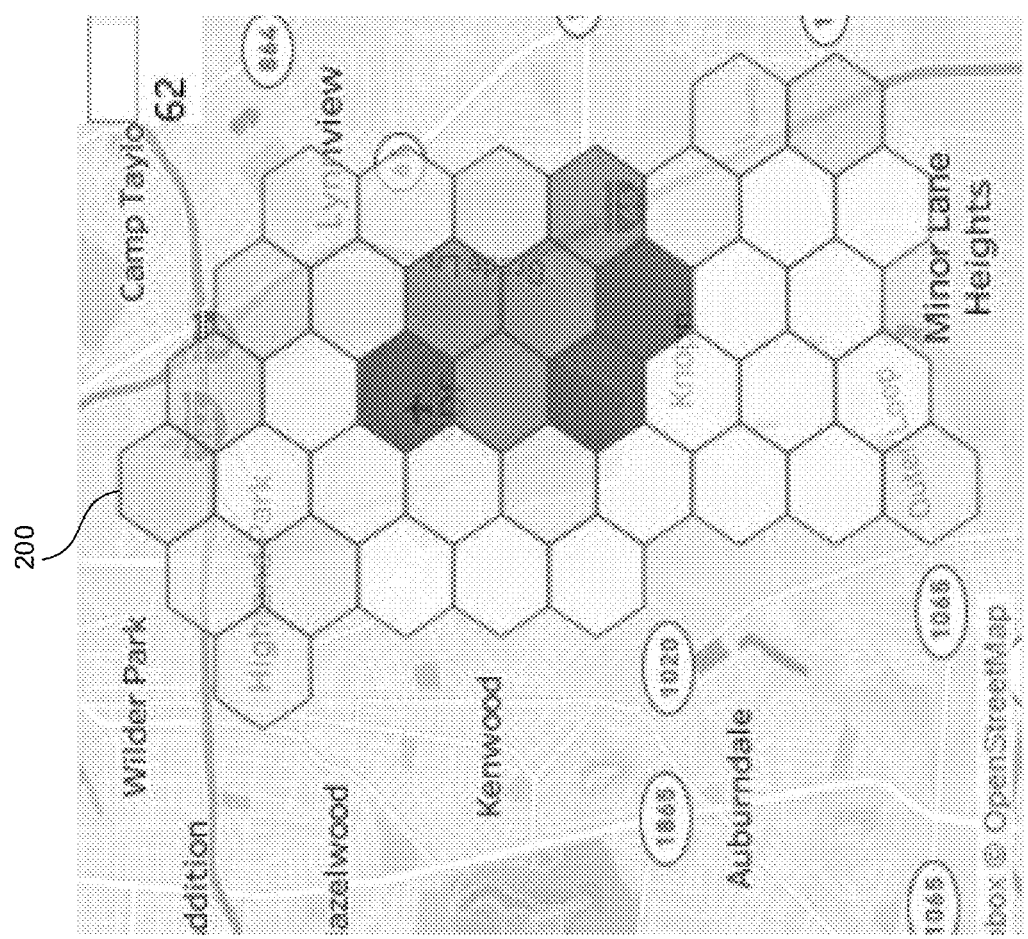
FIG. 2 shows a granularity at which the network is evaluated.

FIG. 2 shows a granularity at which the network 100 is evaluated. A hardware or software processor executing instructions described in this application can divide a geographic area into a hierarchical subdivision having multiple levels. The first level, e.g., a unit 200 (only one labeled for brevity), representing the finest granularity, can be hexagonal and can have a side of approximately 500 m.

The processor can gather KPIs associated with various wireless telecommunication networks ("networks") at the granularity of the unit, where the KPIs can include LTE/5G coverage, signal strength, download speed, and/or upload speed. The processor can gather the KPI data from a third-party source specializing in monitoring network 100 KPIs. The third-party source can be Ookla, Umlaut, OpenSignal. The third-party source can include active data and passive data. To gather active data, the third-party source can wait for a user to instruct the UE to collect information about download speed, upload speed, latency, signal strength, etc. Upon gathering information, the UE can send information to the third party. To gather passive data, the third-party source can collect data about the UE passively, in the background, and perform the data collection periodically, such as every 15 minutes or more frequently.

To convert between the visitors to the unit and the population, the processor can obtain a total population for an entire country, such as the entire United States, and a total number of visitors to various units 200 for the entire country in a day. The processor can establish a conversion between the number of visitors and the number of people living in a unit 200. For example, the processor can calculate the number of visitors to the unit 200 as a percentage of the total visitors for the entire country in a day. To convert to the number of people living in the unit 200, the processor can multiply the total population of the United States by the calculated percentage. Subsequently, the processor can use the calculated population to weight the KPIs for the unit 200.

Figure 3:
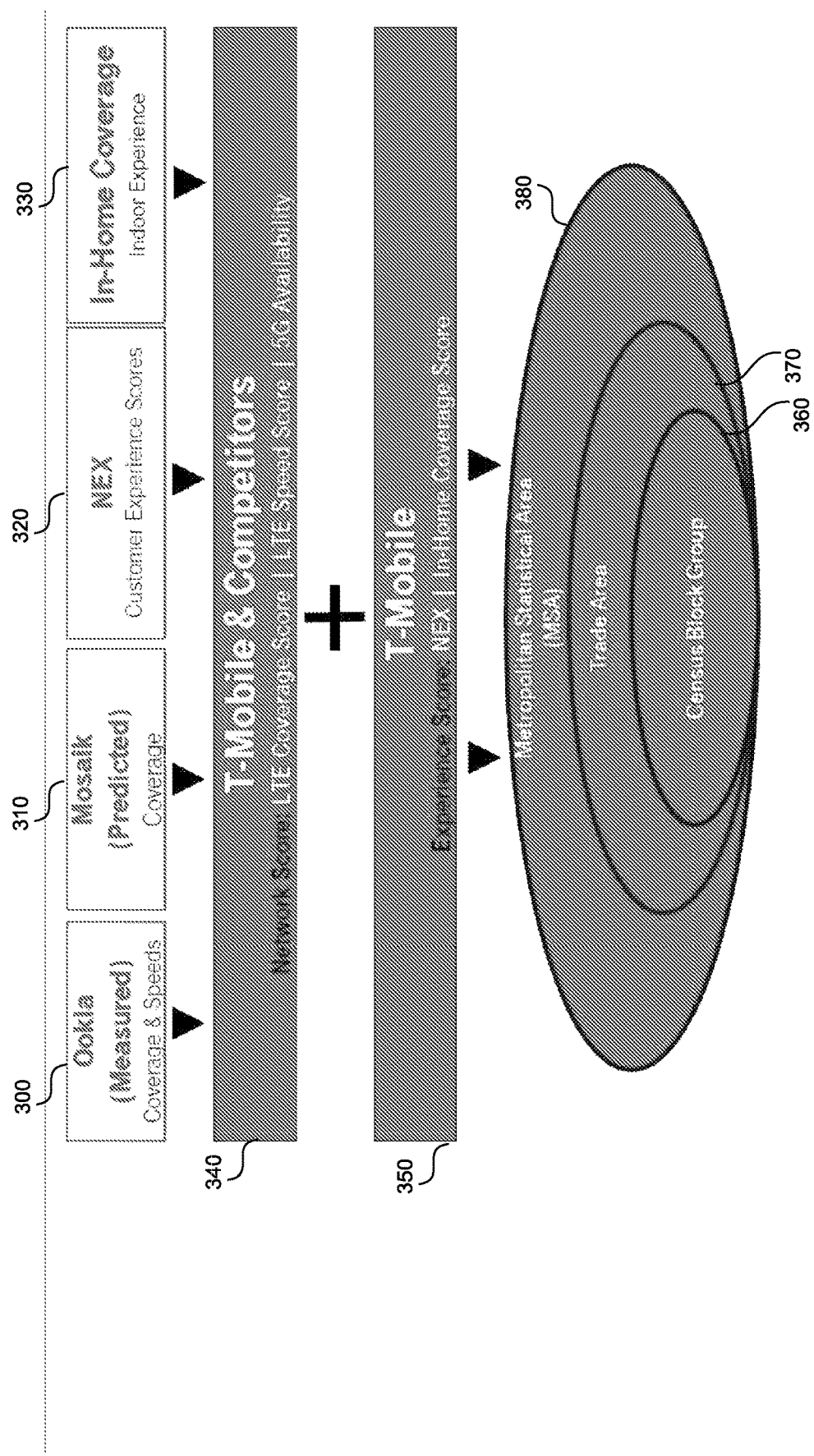
FIG. 3 shows the various inputs used in computing the network readiness score ("network score").

FIG. 3 shows the various inputs used in computing the network readiness score ("network score"). To compute the network score, the processor can gather information from various sources such as measured KPIs 300, predicted KPIs 310, user experience score 320, and in-home coverage 330.

To obtain measured KPIs 300, the processor can gather measured data from network 100 users using active data or passive data as described in this application. To obtain predicted KPIs 310, the processor can obtain publicly released coverage maps from various networks. The predicted KPIs 310 and the measured KPIs 300 can be specific to a generation of technology such as 5G, LTE, 3G, etc., and a particular frequency band. When both measured KPIs 300 and predicted KPIs 310 are available for a particular unit 200 in FIG. 2, the processor can combine the two KPIs by assigning them equal weight, e.g. 0.5, to calculate the KPI for the unit 200. However, if there are no measured KPIs 300 available at a certain unit 200, the processor can utilize the predicted KPIs 310 with the weight of 1. In the areas where the UE is roaming, there are no model KPIs 310 available, so the processor can use the measured KPIs 300, with the weight of 1.

In addition, the processor can include user experience score 320, which can be available only for the home network and not for competitor networks. The user experience score 320 indicates the percentage of subscribers that have a high-quality experience with the network. The in-home coverage 330 can be available only for the home network 100 and not for competitor networks. The in-home coverage 330 can indicate the percentage of subscribers that have at least 3 bars of coverage, and various technology such as 5G, LTE, 3G, etc.

Based on the various data sources 300, 310, 320, 330, the processor can create a network score 340 and an experience score 350. The experience score 350 can be particular to the home network. Based on the network score 340 and the experience score 350, the processor can determine whether a particular level 360, 370, 380 in the hierarchical subdivision of a geographic area is performing satisfactorily, e.g., is network ready.

Figure 4:
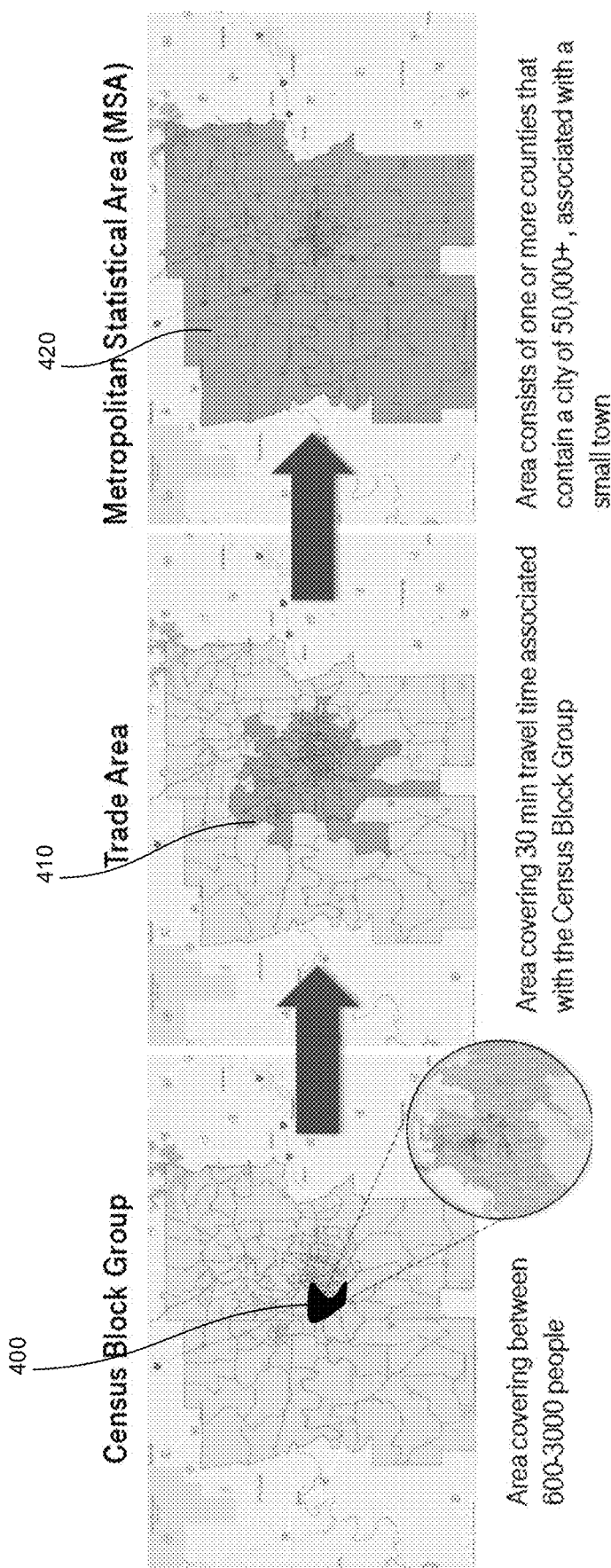
FIG. 4 shows the hierarchical subdivision of a geographic area.

FIG. 4 shows the hierarchical subdivision of a geographic area. The hierarchical subdivision of the geographic area can include 4 levels: a unit 200 in FIG. 2; a cluster 400, e.g., census block group (CBG); a region 410, e.g., trade area; and an area 420, e.g., metropolitan statistical area (MSA). The cluster 400 can include multiple units, the region 410 can include multiple clusters, while the area 420 can include multiple regions.

The cluster 400 can include multiple units 200 and can include a geographic area including between 600 and 3000 people. The region 410 can be an area covering 30-minute to 60-minute travel time around the cluster 400. The area 420 can include one or more counties that contain a city having a population of 50,000 people or more. There are approximately 900 MSAs 420 in the entire United States. A cluster that does not have an overlaying MSA has the closest MSA assigned to it.

To obtain aggregate KPIs at the cluster 400 level, the processor can weigh the KPIs by population and/or number of visitors to the unit 200. The number of visitors to the unit 200 can be represented by combined scans from crowd-source data, which provides the number of visitors to the unit 200 combined of all carriers. The processor can perform the conversion between visits and population, as described in FIG. 2. The higher the population and/or the higher the number of visitors to the unit 200, the higher the weight of the unit 200 KPIs. For example, unit 200 has a population of 10 people and has 70% availability coverage ("coverage"). Coverage is a percentage of the area of the unit 200 that has a network signal strength above a predetermined threshold. A neighboring unit has 20 people and 20% availability coverage. To calculate the aggregate KPI, the processor can perform the below calculation:

(10*70+20*20)/(10+20).

The above calculation can be performed for each KPI, such as coverage, signal strength, and/or speed, to obtain the aggregate KPI.

Figure 5A:
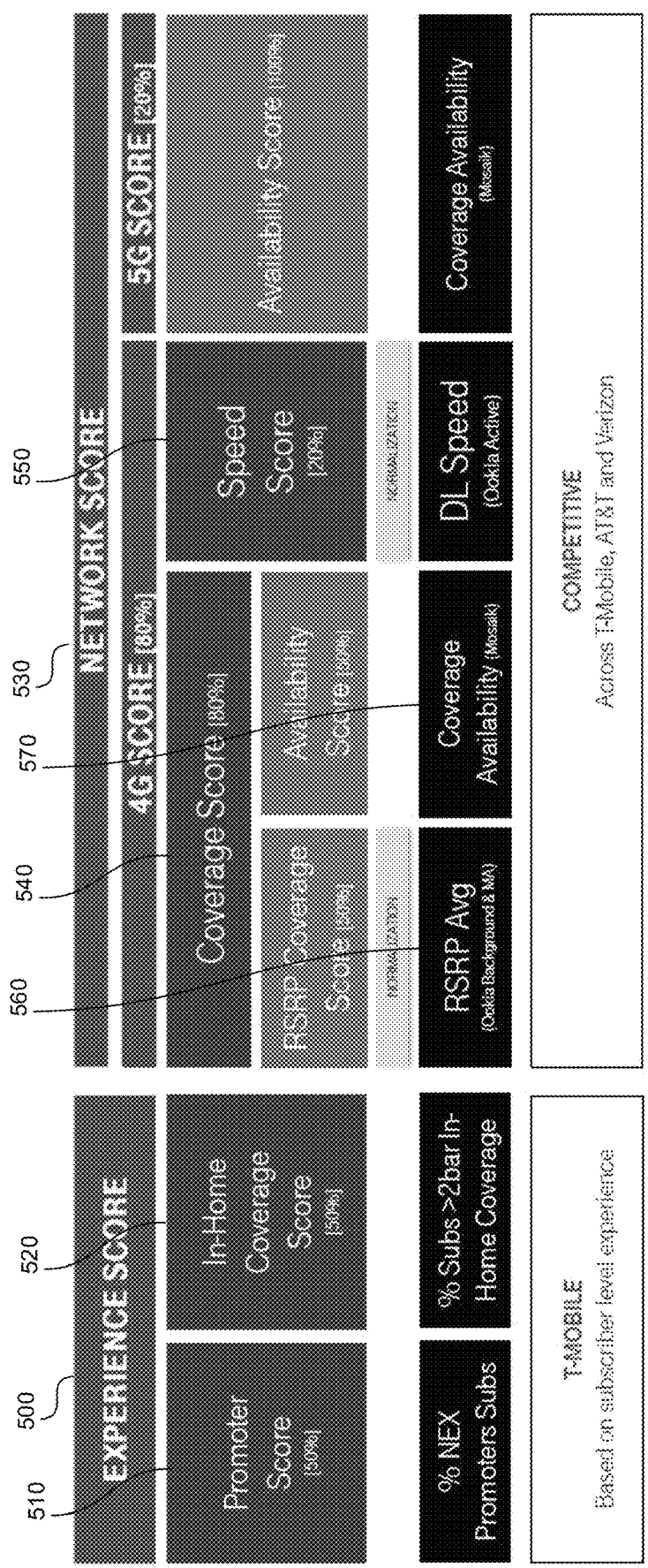
FIGS. 5A-5C show how to calculate network score and experience score for a cluster.

To determine the network score for the cluster 400, the processor computes the network score based on a weighted aggregation of individual KPIs, as described in FIG. 5A. One KPI, Reference Signal Received Power (RSRP), measures signal strength. The processor can use RSRP and speed normalization curves, as explained in FIGS. 5B, 5C, to calculate coverage and speed scores.

Figure 6:
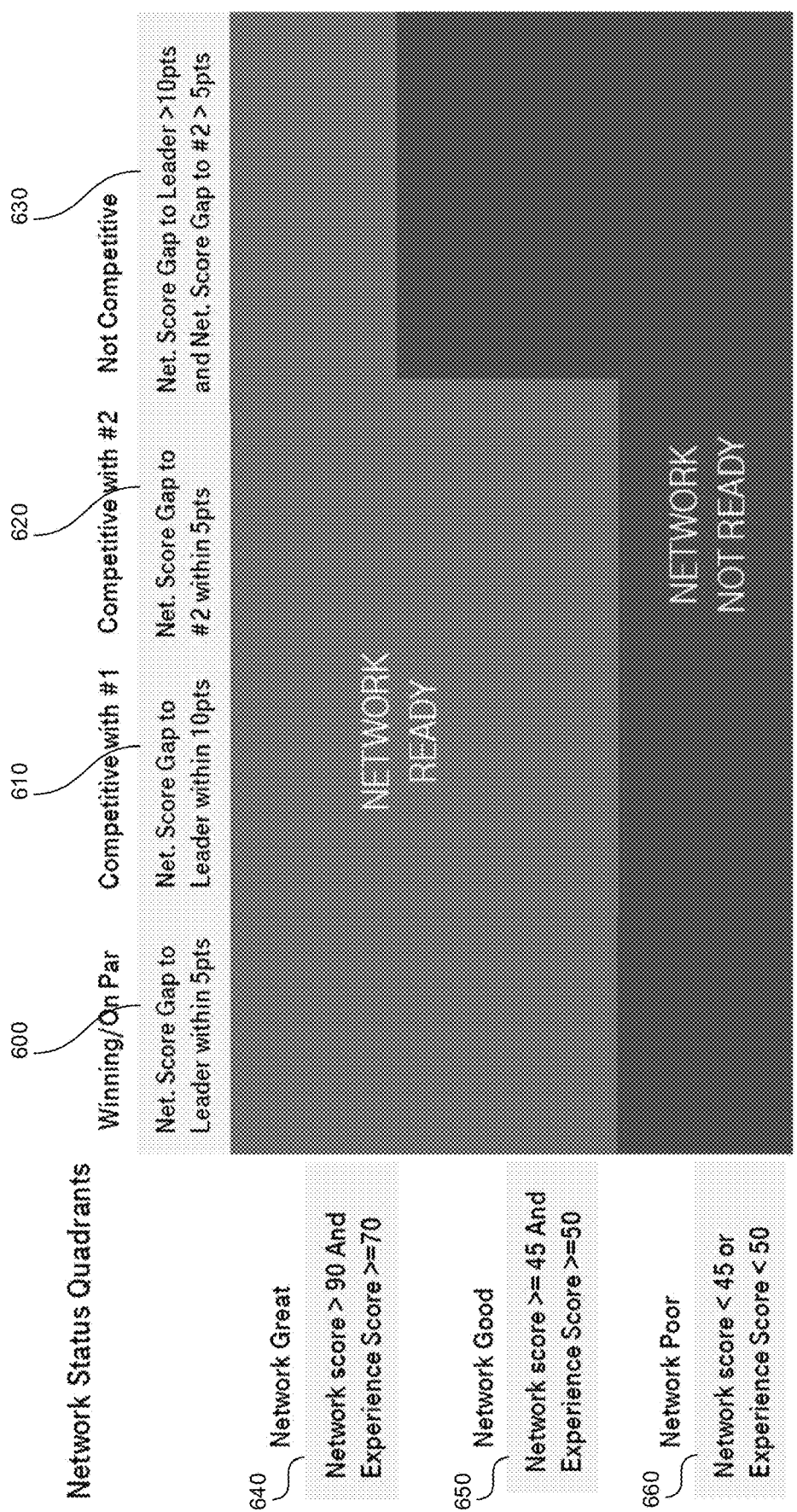
FIG. 6 shows a set of criteria to determine whether a cluster is initially ready based on the experience score and the network score.

The processor determines whether the cluster 400 is initially ready based on network score, experience score, and competitive gap, as described in FIG. 6. The initial readiness indicates a status value of the cluster 400. In other words, initial readiness is an initial indication that the cluster 400 is performing satisfactorily. However, the final determination of whether the cluster 400 is performing satisfactorily depends also on performance of the region 410, and the area 420.

Finally, to determine whether the cluster 400, the region 410, and the area 420 are network ready, e.g. performing satisfactorily, the cluster 400 must be initially ready. The region 410 must have at least a first predetermined threshold percentage of the population in initially ready clusters. The first predetermined threshold percentage can be 60% of the population in the region 410. The area 420 must have at least a second predetermined threshold percentage of the population in initially ready clusters. The second predetermined percentage can be 50% of the population in the area 420. If the region 410 and the area 420 are network ready, then the processor determines that the cluster 400 is network ready. If the cluster 400 is initially ready, but the region 410 and/or the area 420 are not network ready, the cluster 400 is not network ready.

The cluster 400 not being network ready can be an indication to the network 100 operators that additional improvements to the network 100 are needed. The additional improvements can include additional sites, sectors, improved software, etc.

Figure 5B:
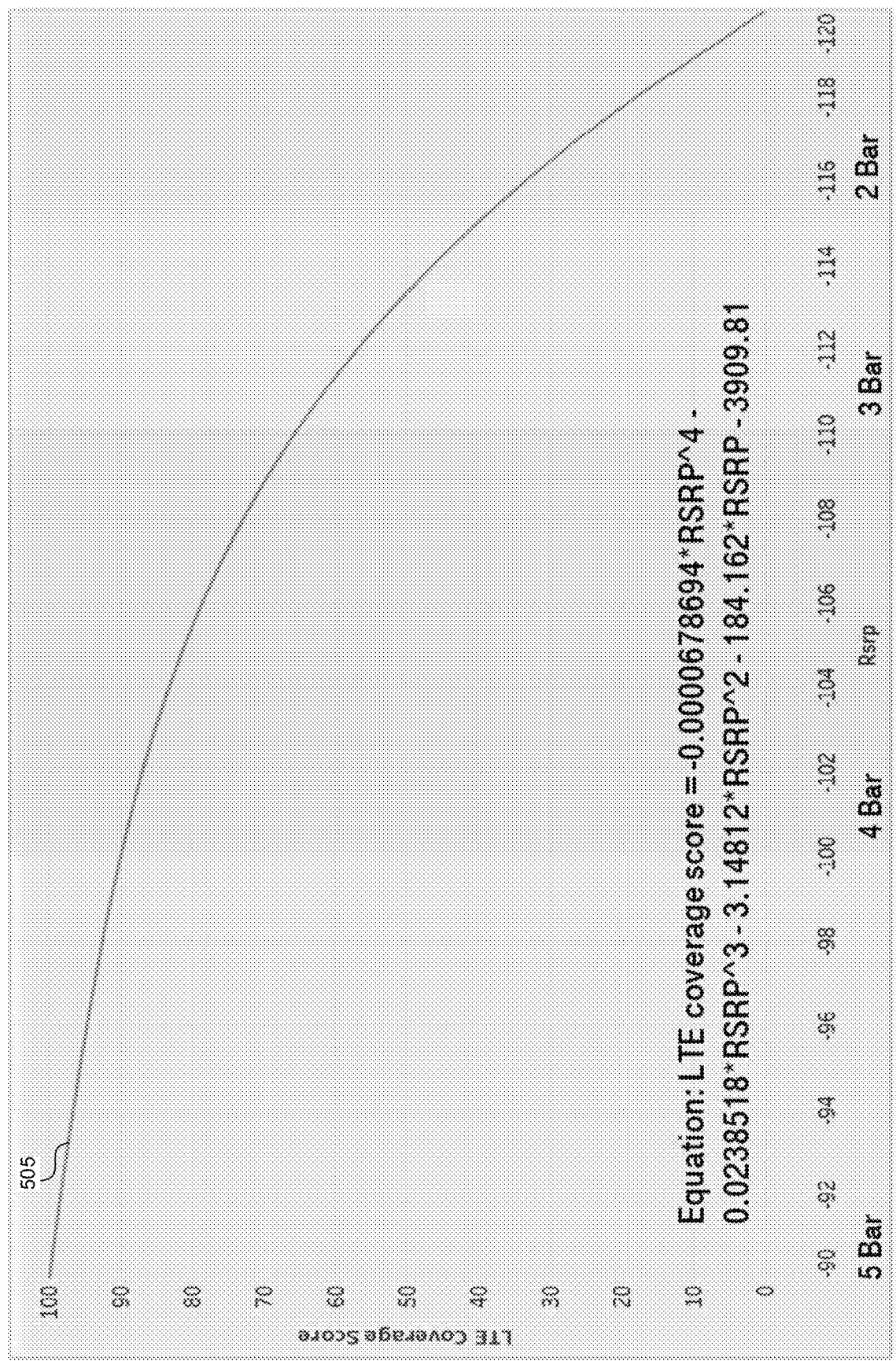
Figure 5C:
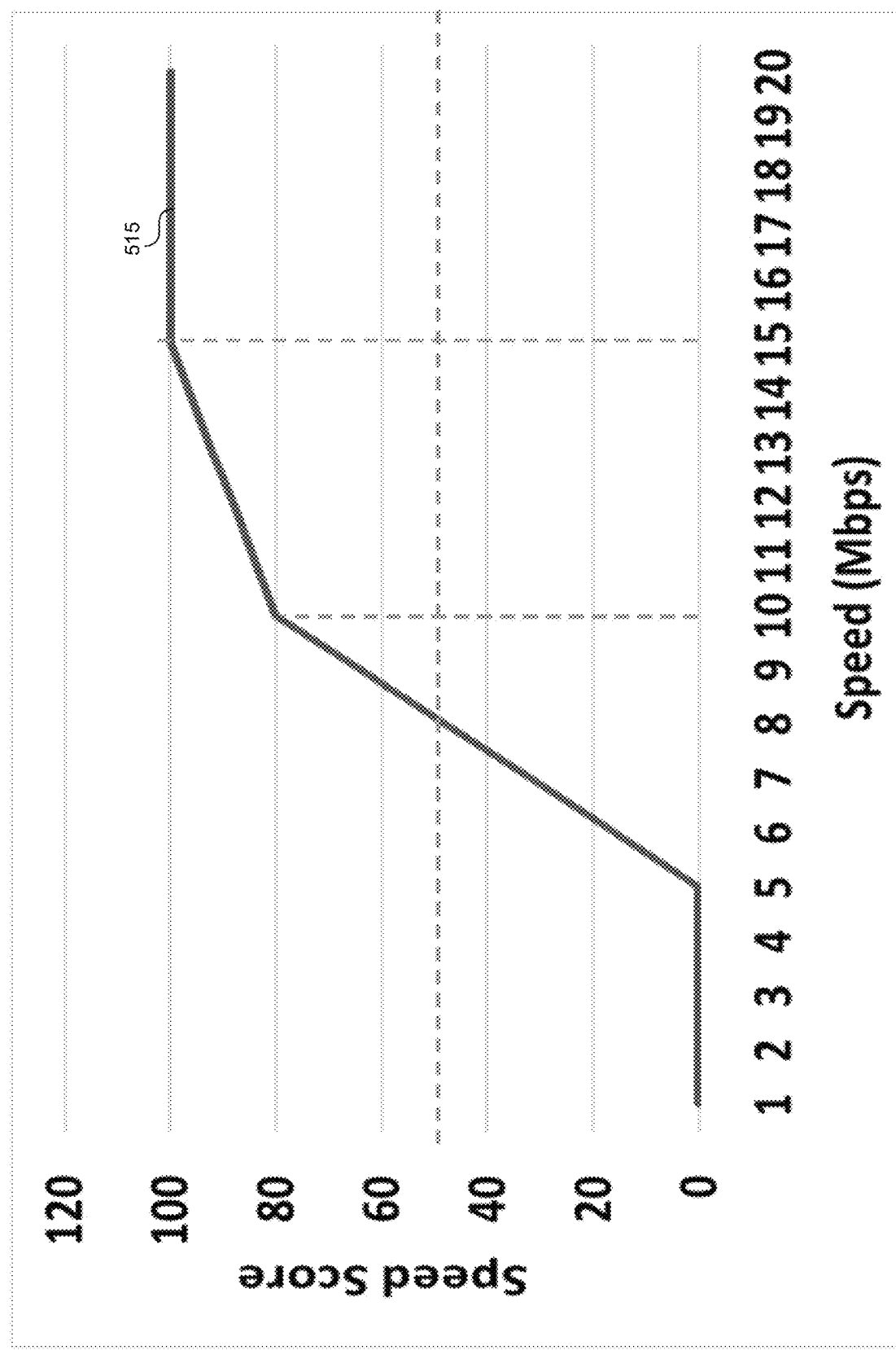

FIGS. 5A-5C show how to calculate network score and experience score for a cluster. The experience score 500 is an equally weighted combination of a promoter score 510 and an in-home coverage score 520. The experience score 500 can be available only for home network 100 users, and not for competitor networks.

The promoter score 510 assigns a value from 1 to 10 to a user, where the value indicates the satisfaction of the user with the network. The higher the value, the higher the user satisfaction. The promoter score 510 indicates the percentage of users having a satisfaction value equal to or greater than 9. The in-home coverage score 520 indicates a percentage of subscribers that have at least 3 coverage bars. The coverage bar on a UE indicates signal strength.

The processor can obtain network score 530 for the home network 100 as well as for the competitors. The network score 530 can be a weighted combination of the coverage score 540 and the speed score 550. The weight of the coverage score 540 can be bigger than the weight of the speed score 550, such as 0.8 and 0.2, respectively.

To compute the coverage score 540, the processor can equally weight a signal strength score 560 and an availability score 570. The availability score 570 is the availability coverage and is a percentage of the area of the unit 200 in FIG. 2 that has a network signal strength above a predetermined threshold.

To compute the signal strength score 560, the processor can obtain the average signal strength over the cluster 400 in FIG. 4. The signal strength is measured in decibel-milliwatts (dBm). Consequently, the processor needs to normalize the signal strength to a predetermined range, such as 0-100, which corresponds to the range of other scores in the computation, such as the promoter score 510, in-home coverage score 520, availability score 570, etc.

FIG. 5B shows a normalization curve 505 used to map the signal strength to the predetermined range. FIG. 5B shows the correspondence between the dBm and a number of bars on a UE. The curve 505 can be a polynomial curve with varying slope. When the signal strength is high, changes to the signal strength affect the signal strength score 560 represented by the Y axis only a little. However, when the signal strength is low, small changes to signal strength affect the signal strength score 560 more than when the signal strength is high.

To compute the speed score 550, the processor can obtain the average download speed over the cluster 400. The download speed is measured in megabits per second (Mbps), and the processor needs to normalize the measurement to the predetermined range, such as 0-100.

FIG. 5C shows a normalization curve 515 used to map the download speed to the predetermined range. As can be seen in FIG. 5C, when the speed is low, small improvements in the speed cause high improvements in the speed score. However, when the speed is high (such as higher than 10 Mbps), large improvements in the speed cause small improvements in the speed score.

The processor can compute to the network score in this manner for various networks 100 such as 5G network, 4G network, 3G network, etc. Alternatively, the processor can utilize only the availability score to determine the network score for 5G network. Finally, the processor can combine the network scores for a 4G network 100 and a 5G network 100 to compute the final network score. The processor can weight one network score more than the other, such as weighting the 4G network score at 0.8 and the 5G network score at 0.2.

FIG. 6 shows a set of criteria to determine whether a cluster is initially ready based on the experience score and the network score. The processor can rank multiple networks, including the home network 100 and the competitor networks, based on the network score 530 in FIG. 5A to obtain a ranked list. Based on the ranked list, the processor can determine to which of the categories 600, 610, 620, 630 the home network 100 belongs.

Category 600 indicates that the network 100 is the first in the ranked list or is within 5 points of the leader in the ranked list. Category 610 indicates that the network 100 is within 10 points of the leader of the ranked list. Category 620 indicates that the network 100 is within 5 points of the second ranked network 100 in the ranked list. Category 630 indicates that the network 100 is more than 10 points away from the leader in the ranked list, and more than 5 points away from the second ranked network 100 in the ranked list.

Based on the experience score 500 in FIG. 5A, and the network score 530 in FIG. 5A, the processor can determine to which of the categories great network 640, good network 650, and poor network 660 the network 100 belongs. Category 640 indicates that the network score was higher than 90 and that the experience score was greater than or equal to 70. Category 650 indicates that the network score was greater than or equal to 45 and that the experience score was greater than or equal to 50. Category 660 indicates that the network score was less than 45 or that the experience score was less than 50. The operators can adjust the thresholds used to categorize the network score and the experience score, based on the operators' preference of how stringent the network readiness evaluation should be.

If the network 100 is in category 660, the processor determines the cluster 400 in FIG. 4 is not initially ready. Similarly, if the network 100 is in the category 650 and category 630, the processor determines that the cluster 400 is not initially ready. Otherwise, the processor determines that the cluster 400 is initially ready. Finally, the processor can determine whether the region 410 in FIG. 4 and the area 420 in FIG. 4 are network ready, as described in this application.

Figure 7:
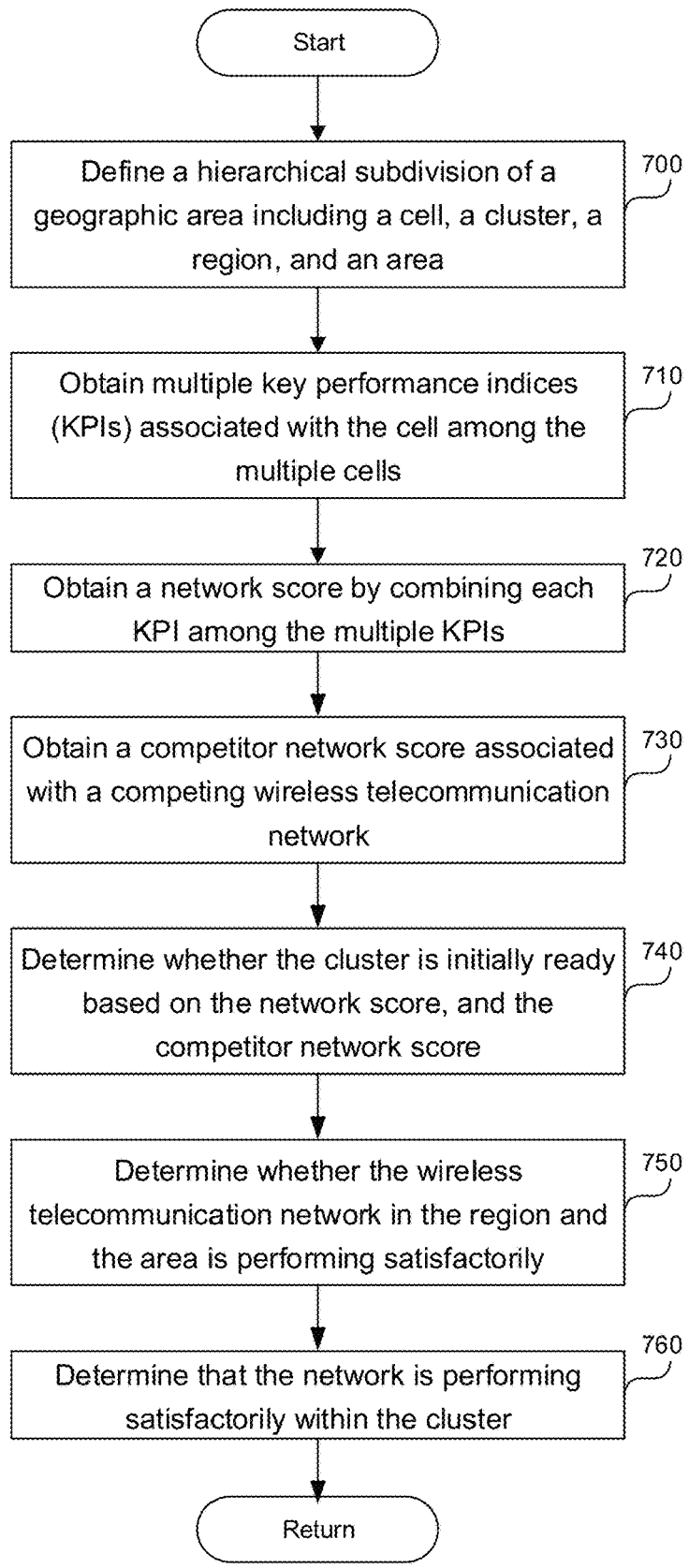
FIG. 7 is a flowchart that illustrates a process to determine the network performance.

FIG. 7 is a flowchart that illustrates a process to determine the network performance. In step 700, the processor can define a hierarchical subdivision of a geographic area. The first level in the hierarchical subdivision can include multiple units, each unit among the multiple units having a predetermined size and shape. For example, the unit can be a hexagon as shown in FIG. 2. The second level in the hierarchical subdivision can include multiple clusters, where each cluster among the multiple clusters can include a subset of the multiple units. The third level in the hierarchical subdivision can include multiple regions, where each region among the multiple regions can include a cluster among the multiple clusters and a subset of the multiple clusters neighboring the cluster. The fourth level in the hierarchical subdivision can include an area including a subset of the multiple regions.

In step 710, the processor can obtain multiple key performance indices (KPIs) associated with the unit among the multiple units, such as signal strength, coverage, and/or upload or download speed.

In step 720, the processor can obtain a network score by combining each KPI among the multiple KPIs associated with each unit in the multiple units. The processor can perform the combination based on population or visitors associated with each unit and based on predetermined weights as described in this application in FIGS. 4, 5A-5C.

To obtain the network score, the processor can obtain a coverage score and a speed score. The processor can obtain the coverage score by obtaining the signal strength score and an availability score, where the signal strength score indicates a strength of a signal associated with the wireless telecommunication network within the cluster, and where the availability score indicates a percentage of area within the cluster where the signal strength is satisfactory. The processor can calculate the coverage score by computing a weighted sum of the coverage score and the availability score, where the coverage score and the availability score are weighted equally. The processor can obtain a speed score indicating a download speed associated with the wireless telecommunication network. Finally, the processor can compute the network score based on a weighted sum of the coverage score and the speed score, where a weight associated with the coverage score is greater than the weight associated with the speed score.

To obtain the network score, the processor can measure network scores of various subnetworks such as a 5G subnetwork, 4G subnetwork, 3G subnetwork, etc. The processor can determine a first network score associated with a 4G portion of the wireless telecommunication network, and a second network score associated with a 5G portion of the wireless telecommunication network. The processor can compute the network score based on a weighted sum of the first network score and the second network score, where a first weight associated with the first network score is greater than a second weight associated with the second network score. For example, the 4G subnetwork can be weighted 30%, while the 5G subnetwork can be weighted 70%, or vice versa, depending on the importance of the subnetwork.

To obtain the network score, the processor can obtain a signal strength associated with the unit, wherein the signal strength can be measured or predicted, as described in this application. The processor can normalize the signal strength using a curve having a varying slope, where the slope of the curve increases with decreasing signal strength, as described in FIGS. 5A-5C.

To obtain the network score, the processor can obtain a download speed associated with the unit, where the download speed can be measured or predicted. The processor can normalize the signal strength using a curve having a varying slope, where the slope of the curve decreases with increasing download speed, as described in FIGS. 5A-5C.

In addition to the network score, the processor can obtain an experience score indicating a user satisfaction with the wireless telecommunication network, wherein the user is located within the cluster for which the experience score is being computed. Experience score indicates a user satisfaction with the network based on a voice dropped call count, a voice dropped call rate, a low coverage value, a data leakage value, an average air interface, e.g., Long-Term Evolution (LTE) or 5G, throughput value, voice muting, voice garbling, voice soft drops, and/or number of minutes between radio access technology (RAT) change.

In step 730, the processor can obtain a competitor network score associated with a competing wireless telecommunication network.

In step 740, the processor can determine whether the cluster is initially ready based on the network score and the competitor network score. To make the determination, the processor can obtain an experience score indicating a user satisfaction with the wireless telecommunication network, where the user is located within the cluster. The processor can define multiple categories indicating quality of service provided by the wireless telecommunication network, where the multiple categories include a great network, a good network, and a poor network. Based on the network score and the experience score, the processor can determine a category among the multiple categories to which the wireless telecommunication network belongs. When the wireless telecommunication network belongs to the poor network, the processor can determine that the cluster is not initially ready. The processor can compare the network score of the wireless telecommunication network and the competitor network score associated with the competing wireless telecommunication network to determine whether the wireless telecommunication network is not competitive compared to the competing wireless telecommunication network. When the wireless telecommunication network belongs to the good network and the wireless telecommunication network is not competitive compared to the competing wireless telecommunication network, the processor can determine that the cluster is not initially ready.

In step 750, the processor can determine whether the wireless telecommunication network in the region and the area is performing satisfactorily by determining whether a first predetermined percentage of population in the region and a second predetermined percentage of population in the area reside in one or more clusters that have been determined to be initially ready. The first predetermined percentage can be 60%, while the second predetermined percentage can be 50% as described in FIG. 4.

To determine whether the wireless telecommunication network in the region and the area is performing satisfactorily, the processor can make a first determination by determining that the region has at least 60% of population in one or more clusters that have been determined to be initially ready. The processor can make a second determination by determining that the area has at least 50% of population in one or more clusters that have been determined to be initially ready. Upon making the first determination and the second determination, the processor can determine that the network is performing satisfactorily within the cluster.

In step 760, upon determining that the cluster is initially ready, and that the wireless telecommunication network is performing satisfactorily in the region and the area, the processor can determine that the network is performing satisfactorily within the cluster.

The processor can translate a number of visitors to the unit into a population of the unit by establishing a correspondence between a total population of a predetermined region and a total number of visitors to the predetermined region. The predetermined region can be a whole country, such as the United States. Based on the correspondence and a number of visitors to the unit, the processor can determine the population of the unit.

Computer System

Figure 8:
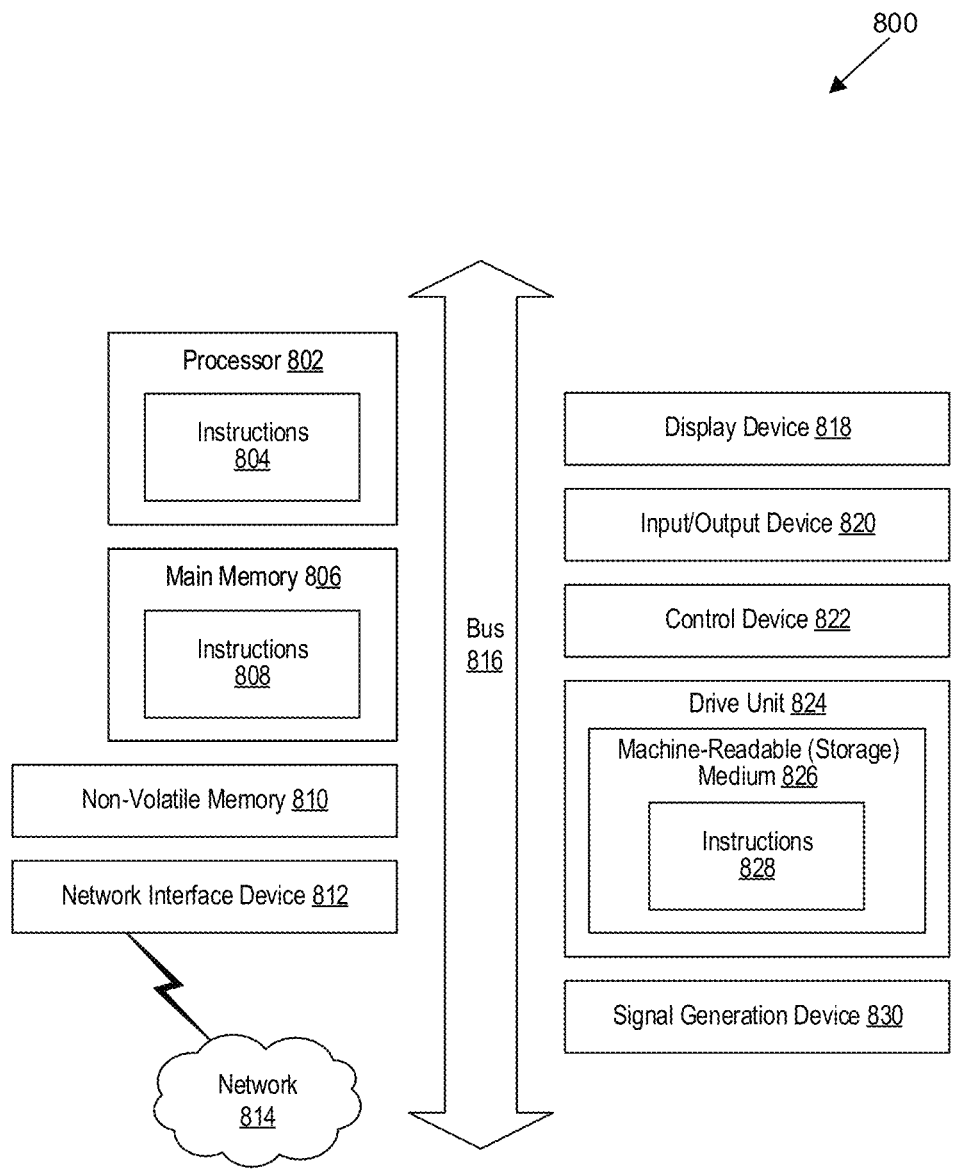
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the Figures and any other components described in this specification can be implemented.

The processor 802 can execute the instructions described in this application, for example in FIG. 7. The main memory 806, the non-volatile memory 810, and/or the drive unit 824 can store the instructions executed by the processor 802. The network 814 can be the network 100 in FIG. 1, or can be used to communicate between user devices, the network 100, and various third parties providing information about competitor networks, as described in this application.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer system (SBC), or a distributed system such as a mesh of computer systems, or the computer system 800 can include one or more cloud components in one or more networks. Where appropriate, one or more computer systems 800 can perform operations in real time, in near real time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable (storage) medium 826) can be local, remote, or distributed. Although shown as a single medium, the machine-readable (storage) medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable (storage) medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated upon or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or a continuing application.

We claim:

1. At least one computer-readable storage medium, excluding transitory signals and carrying instructions, which, when executed by at least one data processor of a system, cause the system to:
   define a hierarchical subdivision of a geographic area,
      wherein a first level in the hierarchical subdivision includes multiple units, each unit among the multiple units having a predetermined size and shape,
      wherein a second level in the hierarchical subdivision includes multiple clusters, each cluster among the multiple clusters including a subset of multiple units,
      wherein a third level in the hierarchical subdivision includes multiple regions, each region among the multiple regions including a cluster among the multiple clusters and a subset of the multiple clusters neighboring the cluster, and
      wherein a fourth level in the hierarchical subdivision includes an area including a subset of the multiple regions;
   obtain multiple key performance indices (KPIs) associated with the unit among the multiple units,
      wherein the multiple KPIs include at least two of: signal strength, speed, or coverage associated with a telecommunication network;
   combine the subset of multiple units contained in the cluster by weighting each KPI among the multiple KPIs associated with each unit in the multiple units based on population living in or visiting each unit to obtain a KPI aggregation for each KPI to obtain multiple KPI aggregations;
   combine the multiple KPI aggregations into a network score;
   obtain an experience score indicating a user satisfaction with the telecommunication network,
      wherein a user is located within the cluster;
   obtain a competitor network score associated with a competing network;
   determine whether the cluster is initially ready based on the network score, the competitor network score, and the experience score;
   determine whether the telecommunication network in the region and the area is performing satisfactorily by determining whether a first predetermined population in the region and a second predetermined population in the area reside in one or more clusters that have been determined to be initially ready; and
   upon determining that the cluster is initially ready, and that the telecommunication network is performing satisfactorily in the region and the area, determine that the telecommunication network is performing satisfactorily within the cluster.

2. The at least one computer-readable storage medium of claim 1, wherein the system to combine the multiple KPI aggregations into the network score is further caused to:
obtain a coverage score by:
obtaining a signal strength score and an availability score,
wherein the signal strength score indicates a strength of a signal associated with the telecommunication network within the cluster, and
wherein the availability score indicates a percentage of area within the cluster where the signal strength is satisfactory;
calculating the coverage score by computing a weighted sum of the coverage score and the availability score,
wherein the coverage score and the availability score are weighted equally;
obtain a speed score indicating a download speed associated with the telecommunication network; and
compute the network score based on a weighted sum of the coverage score and the speed score,
wherein a weight associated with the coverage score is greater than the weight associated with the speed score.

3. The at least one computer-readable storage medium of claim 1, wherein the system to combine the multiple KPI aggregations into the network score is further caused to:
determine a first network score associated with a 4G portion of the telecommunication network;
determine a second network score associated with a 5G portion of the telecommunication network; and
compute the network score based on a weighted sum of the first network score and the second network score,
wherein a first weight associated with the first network score is greater than a second weight associated with the second network score.

4. The at least one computer-readable storage medium of claim 1, wherein the system to combine the multiple KPI aggregations into the network score is further caused to:
obtain a download speed associated with the unit,
wherein the download speed can be measured or predicted;
normalize the download speed using a curve having a varying slope,
wherein the slope of the curve decreases with increasing download speed.

5. The at least one computer-readable storage medium of claim 1, wherein the system to determine whether the cluster is initially ready is further caused to:
define multiple categories indicating quality of service provided by the telecommunication network,
wherein the multiple categories include a great network, a good network, and a poor network;
based on the network score and the experience score, determine a category among the multiple categories to which the telecommunication network belongs;
when the telecommunication network belongs to the poor network, determine that the cluster is not initially ready;
compare the network score of the telecommunication network and the competitor network score associated with the competing network to determine whether the telecommunication network is not competitive compared to the competing network; and
when the telecommunication network belongs to the good network and the telecommunication network is not competitive compared to the competing network, determine that the cluster is not initially ready.

6. The at least one computer-readable storage medium of claim 1, wherein the system to determine whether the telecommunication network in the region and the area is performing satisfactorily is further caused to:
make a first determination by determining that the region has at least 60% of population in the one or more clusters that have been determined to be initially ready; and
make a second determination by determining that the area has at least 50% of population in the one or more clusters that have been determined to be initially ready; and
upon making the first determination and the second determination, determine that the telecommunication network is performing satisfactorily within the cluster.

7. A system comprising:
at least one hardware processor; and
at least one non-transitory memory storing instructions, which, when executed by the at least one hardware processor, cause the system to:
define a hierarchical subdivision of a geographic area,
wherein the hierarchical subdivision includes at least three of:
a first level in the hierarchical subdivision includes multiple units, each unit among the multiple units having a predetermined size and shape,
a second level in the hierarchical subdivision includes multiple clusters, each cluster among the multiple clusters including a subset of multiple units,
a third level in the hierarchical subdivision includes multiple regions, each region among the multiple regions including a cluster among the multiple clusters and a subset of the multiple clusters neighboring the cluster, and
a fourth level in the hierarchical subdivision includes an area including a subset of the multiple regions;
obtain multiple KPIs associated with one of the first, second, third or fourth levels;
obtain a network score by combining each KPI among the multiple KPIs associated with one level;
obtain a competitor network score associated with a competing network;
determine a status value of another of the first, second, third or fourth levels based on the network score and the competitor network score; and
determine whether a network is performing satisfactorily by determining whether the status value for at least a first predetermined percentage of population in the other level is acceptable.

8. The system of claim 7, the instructions to obtain the network score further comprising the instructions to:
obtain a coverage score by:
obtaining a signal strength score and an availability score,
wherein the signal strength score indicates a strength of a signal associated with the network within the cluster, and
wherein the availability score indicates a percentage of area within the cluster where a signal strength associated with the network is satisfactory;

calculating the coverage score by computing a weighted sum of the coverage score and the availability score,
wherein the coverage score and the availability score are weighted equally;
obtain a speed score indicating a download speed associated with the network; and
compute the network score based on a weighted sum of the coverage score and the speed score,
wherein a weight associated with the coverage score is greater than the weight associated with the speed score.

9. The system of claim 7, further comprising the instructions to:
translate a number of visitors to the unit into a population of the unit by establishing a correspondence between a total population of a predetermined region and a total number of visitors to the predetermined region; and
based on the correspondence and the number of visitors to the unit, determine the population of the unit.

10. The system of claim 7, the instructions to obtain the network score further comprising instructions to:
determine a first network score associated with a 4G portion of the network;
determine a second network score associated with a 5G portion of the network; and
compute the network score based on a weighted sum of the first network score and the second network score,
wherein a first weight associated with the first network score is greater than a second weight associated with the second network score.

11. The system of claim 7, the instructions to obtain the network score further comprising the instructions to:
obtain a signal strength associated with the unit,
wherein the signal strength can be measured or predicted;
normalize the signal strength using a curve having a varying slope,
wherein the slope of the curve increases with decreasing signal strength.

12. The system of claim 7, further comprising instructions to determine the status value by:
obtaining an experience score indicating a user satisfaction with the network,
wherein a user is located within the cluster;
defining multiple categories indicating quality of service provided by the network,
wherein the multiple categories include a great network, a good network, and a poor network;
based on the network score and the experience score, determining a category among the multiple categories to which the network belongs;
when the network belongs to the poor network, determining that the cluster is not initially ready;
comparing the network score of the network and the competitor network score associated with the competing network to determine whether the network is not competitive compared to the competing network; and
when the network belongs to the good network and the network is not competitive compared to the competing network, determining that the cluster is not initially ready.

13. The system of claim 7, further comprising instructions to determine whether the network in the region and the area is performing satisfactorily by:
making a first determination by determining that the region has at least 60% of population in one or more clusters that have been determined to be initially ready; and
making a second determination by determining that the area has at least 50% of population in the one or more clusters that have been determined to be initially ready; and
upon making the first determination and the second determination, determining that the network is performing satisfactorily within the cluster.

14. A method comprising:
defining a hierarchical subdivision of a geographic area,
wherein a first level in the hierarchical subdivision includes multiple units, each unit among the multiple units having a predetermined size and shape,
wherein a second level in the hierarchical subdivision includes multiple clusters, each cluster among the multiple clusters including a subset of multiple units, and
wherein a third level in the hierarchical subdivision includes multiple regions, each region among the multiple regions including a cluster among the multiple clusters and a subset of the multiple clusters neighboring the cluster, and
wherein a fourth level in the hierarchical subdivision includes an area including a subset of the multiple regions;
obtaining multiple KPIs associated with the unit among the multiple units;
obtaining a network score by combining each KPI among the multiple KPIs associated with each unit in the multiple units;
obtaining a competitor network score associated with a competing network;
determining whether the cluster is initially ready based on the network score and the competitor network score;
determining whether a network in the region and the area is performing satisfactorily by determining whether a first predetermined percentage of population in the region and a second predetermined percentage of population in the area reside in one or more clusters that have been determined to be initially ready; and
upon determining that the cluster is initially ready, and that the network is performing satisfactorily in the region and the area, determining that the network is performing satisfactorily within the cluster.

15. The method of claim 14, the obtaining the network score further comprising:
obtaining a coverage score by:
obtaining a signal strength score and an availability score,
wherein the signal strength score indicates a strength of a signal associated with the network within the cluster, and
wherein the availability score indicates a percentage of area within the cluster where a signal strength associated with the network is satisfactory;
calculating the coverage score by computing a weighted sum of the coverage score and the availability score,
wherein the coverage score and the availability score are weighted equally;
obtaining a speed score indicating a download speed associated with the network; and
computing the network score based on a weighted sum of the coverage score and the speed score, wherein a weight associated with the coverage score is greater than the weight associated with the speed score.

16. The method of claim 14, further comprising:
translating a number of visitors to the unit into a population of the unit by establishing a correspondence between a total population of a predetermined region and a total number of visitors to the predetermined region; and
based on the correspondence and the number of visitors to the unit, determining the population of the unit.

17. The method of claim 14, the obtaining the network score further comprising:
obtaining a signal strength associated with the unit,
wherein the signal strength can be measured or predicted;
normalizing the signal strength using a curve having a varying slope,
wherein the slope of the curve increases with decreasing signal strength.

18. The method of claim 14, the obtaining the network score further comprising:
obtaining a download speed associated with the unit,
wherein the download speed can be measured or predicted;
normalizing the download speed using a curve having a varying slope,
wherein the slope of the curve decreases with increasing download speed.

19. The method of claim 14, the determining whether the cluster is initially ready further comprising:
obtaining an experience score indicating a user satisfaction with the network,
wherein a user is located within the cluster;
defining multiple categories indicating quality of service provided by the network,
wherein the multiple categories include a great network, a good network, and a poor network;
based on the network score and the experience score, determining a category among the multiple categories to which the network belongs;
when the network belongs to the poor network, determining that the cluster is not initially ready;
comparing the network score of the network and the competitor network score associated with the competing network to determine whether the network is not competitive compared to the competing network; and
when the network belongs to the good network and the network is not competitive compared to the competing network, determining that the cluster is not initially ready.

20. The method of claim 14, the determining whether the network in the region and the area is performing satisfactorily further comprising:
making a first determination by determining that the region has at least 60% of population in the one or more clusters that have been determined to be initially ready; and
making a second determination by determining that the area has at least 50% of population in the one or more clusters that have been determined to be initially ready; and
upon making the first determination and the second determination, determining that the network is performing satisfactorily within the cluster.

* * * * *